United States Patent
Challapali et al.

(10) Patent No.: US 9,198,264 B2
(45) Date of Patent: Nov. 24, 2015

(54) POLICY-BASED OLN LIGHT MANAGEMENT SYSTEM

(75) Inventors: Kiran Srinivas Challapali, New City, NY (US); Dave Alberto Tavares Cavalcanti, Mahopac, NY (US); Jianfeng Wang, Ossining, NY (US); Hongqiang Zhai, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 326 days.

(21) Appl. No.: 13/997,761

(22) PCT Filed: Dec. 19, 2011

(86) PCT No.: PCT/IB2011/055764
§ 371 (c)(1),
(2), (4) Date: Jun. 25, 2013

(87) PCT Pub. No.: WO2012/090113
PCT Pub. Date: Jul. 5, 2012

(65) Prior Publication Data
US 2013/0285556 A1    Oct. 31, 2013

Related U.S. Application Data

(60) Provisional application No. 61/428,258, filed on Dec. 30, 2010.

(51) Int. Cl.
H05B 37/02    (2006.01)
(52) U.S. Cl.
CPC ........ H05B 37/0272 (2013.01); H05B 37/0245 (2013.01); Y02B 20/72 (2013.01)
(58) Field of Classification Search
CPC ........... H05B 33/081; H05B 37/02451; Y02B 20/721; G06F 13/42
See application file for complete search history.

(56) References Cited

U.S. PATENT DOCUMENTS

| 6,016,038 | A | 1/2000 | Mueller |
| 6,211,626 | B1 | 4/2001 | Lys |
| 8,766,544 | B2 * | 7/2014 | Velazquez ..................... 315/132 |
| 8,963,433 | B2 * | 2/2015 | Jarrell et al. .................. 315/131 |
| 2009/0302782 | A1 | 12/2009 | Smith |

FOREIGN PATENT DOCUMENTS

| CN | 201496806 U | 6/2010 |
| WO | 2007126662 A2 | 11/2007 |
| WO | 2009117695 A1 | 9/2009 |
| WO | 2010014925 A2 | 2/2010 |

OTHER PUBLICATIONS

Volosencu, Constantin et al "Hierarchical Approach for Intelligent Lighting Control in Future Urban Environments", IEEE, 2008.

* cited by examiner

*Primary Examiner* — Hai L Nguyen (57) ABSTRACT

A policy-based OLN (outdoor lighting network) light management system including a central control apparatus (40); lighting unit control apparatus (50); a communication system (60) operably connecting the central control apparatus (40) and the lighting unit control apparatus (50); and a repository (70) in communication with the central control apparatus (40), the repository (70) being operable to store an OLN policy. The central control apparatus (40) is operable to: receive a policy; check the policy for consistency against the OLN policy; determine attributes and configuration commands for each of the lighting unit control apparatus (50) in accordance with the policy when the policy is consistent with the OLN policy; and communicate the attributes and the configuration commands for each of the lighting unit control apparatus (50) to a corresponding one of the lighting unit control apparatus (50).

33 Claims, 6 Drawing Sheets

POLICY-BASED OLN LIGHT MANAGEMENT SYSTEM

The technical field of this disclosure is outdoor lighting networks (OLNs), particularly, policy-based OLN light management systems.

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a controller for independently controlling the output of the LEDs in order to generate a variety of colors and color-changing lighting effects, for example, as discussed in detail in U.S. Pat. Nos. 6,016,038 and 6,211,626, incorporated herein by reference.

Outdoor lights, such as lighting for roadways, streets, parking facilities, parks, landscapes, footpaths, and bicycle paths, are normally managed by a single authority. For example, street lights in New York City are managed by the Department of Transportation. Central control by one authority allows better security, better coordination of use, and reduced maintenance cost. Most outdoor lights currently operate independently or in small groups supplied from a common power source. However, with the rise of the Internet and wireless communication systems, there is a trend toward networking of outdoor lights and managing operation of the outdoor lights through a centralized server.

The new generation lights like LEDs have the capability to adjust dimming level and color on demand. This allows additional flexibility in saving energy, reducing light pollution, and complying with local lighting regulations. Unfortunately, the present generation of outdoor lighting does not employ a control and management system that is able to take advantage of this flexibility.

Current management systems incorporate proprietary software tools that are inflexible and require substantial training to use, incurring substantial costs. Initial device capabilities and control options are programmed into the software before deployment or at the commissioning and configuration of the lighting system. Before deployment, software customization is often required to meet the requirements of the particular city or other geographic region in which the lighting system is to be deployed. Configuration options can be extremely complicated. For instance, configuring dimming schedules for lighting units according to specific requirements/regulations for each area can be very complex. In many cases, the managed outdoor lighting network can include thousands of light units. Lighting units can be configured in groups in some cases, but even this is often insufficient to make the deployment manageable. Lighting system managers and installers have to be trained extensively on how to use the software and must identify configuration options to be implemented. After deployment, changes in lighting requirements due to changes in regulations or management desires require further software customization to implement the lighting requirement changes. Also, if a new lighting unit with new capabilities is introduced into the outdoor lighting network after deployment, these new capabilities cannot be utilized unless the management software is further customized with software upgrades. There is also no way to verify system compliance, e.g., adherence to regulations or industry standards, after deployment. The compliance process is typically performed at the lighting design stage, and only a few measurements taken after deployment. In addition, there is no historical record to track what lighting configuration was in place at any particular time in the past.

The existing systems are also inflexible from the device configuration, operation, and performance stand point. For example, luminaires are manufactured to meet certain performance standards, but the actual needs for a given area may change after the luminaires are deployed. The luminaire can remain in its initial deployment configuration for the 10 to 15 year lifetime of the luminaire. In the case of an outdoor lighting network, there can be a large number of lighting units deployed all over a city, for instance in the tens of thousands. Currently, there is no convenient way to re-configure the performance of the lighting systems to meet new performance and operational requirements. In some cases, it is not even possible to change the system when lighting units do not have required capabilities to adapt their operation. The state of the art in re-configuring lighting systems is to update the firmware of each of the many lighting units in the network with some limited remote control of operation of the lighting units. The lighting units may have various versions of hardware and software, since the deployed lifetime for each luminaire can be large. Thus, keeping track of compatibility of firmware upgrades for each of the deployed luminaire is impractical.

It would be desirable to have a policy-based OLN light management system that would overcome the above disadvantages. The PBLM provides a systematic way to manage configuration, performance, operation, security, access control, and service level for outdoor lighting systems. Some of the benefits include: ease of customization to meet the local (e.g. municipal) lighting regulation; ease of management of heterogeneous lighting devices; ease of system upgrade (e.g., new devices can be easily added and configured); ease of conformance with new lighting regulations developed after deployment when device capabilities permit it; and prioritization among multiple applications and users.

The policy-based OLN light management (PBLM) system as described herein allows an operator to specify behavior of the outdoor lighting network without having to separately specify behavior of each lighting unit control apparatus connected to one or more lighting units. By employing a PBLM system, the behavior of the outdoor lighting network can be changed post deployment without changing the implementation, such as hardware and firmware. In one example, the PBLM system operates on a central control apparatus, and includes an outdoor lighting network (OLN) repository having OLN attributes and an OLN policy. When the outdoor lighting network is initially installed, the installer populates the OLN attributes with information about the lighting unit control apparatus and associated lighting units. The installer also populates the OLN policy, which governs operation of the outdoor lighting network, considering goals and constraints due to regulatory, management, and device requirements, which are specified by policies in policy subsets. The policy subsets are combined into an OLN policy, which implements the operating goals and constraints to the extent that they are consistent with each other.

The operator can make changes to the OLN policy without the need to spell out specific operations or behaviors in terms of detailed command/schedules. Instead, the operator can specify the end result in the format of a high level policy that is easy to understand, and the PBLM system will translate into specific operational commands/behavior. When a policy subset is proposed, e.g., after new regulations are passed, the central control apparatus reviews the proposed policy subset against the existing OLN policy to determine that the proposed policy is feasible and that it is consistent with any higher ranked policy. The central control apparatus determines that the proposed policy is feasible or resolves inconsistencies between the policies, then updates the OLN policy with the proposed policy as feasible. The central control apparatus can execute the updated OLN policy by providing information to the lighting unit control apparatus as required. In one exemplary embodiment, a newly installed lighting unit control apparatus can automatically provide a device policy subset to the central control apparatus for review when the device is installed.

One aspect of the invention provides a light management system for an outdoor lighting network (OLN), including a central control apparatus; a plurality of lighting unit control apparatus; a communication system operably connecting the central control apparatus and the lighting unit control apparatus; and a repository in communication with the central control apparatus, the repository being operable to store an OLN policy. The central control apparatus is operable to receive a policy; and check the policy for consistency against the OLN policy. When the policy is consistent with the OLN policy, the central control apparatus is further operable to determine attributes and configuration commands for each of the plurality of lighting unit control apparatus in accordance with the policy; and communicate the attributes and the configuration commands for each of the plurality of lighting unit control apparatus to a corresponding one of the plurality of lighting unit control apparatus.

Another aspect of the invention provides a user control apparatus enabling a user to control certain aspects of an outdoor lighting network, the apparatus comprising: a processor; a memory operably connected to the processor; and a communication module operably connected to the processor for communication between the user and the outdoor lighting network. The processor is operable to: generate a temporary user policy; and transmit the temporary user policy through the communication module to the outdoor lighting network.

Another aspect of the invention provides a central control apparatus to manage an outdoor lighting network including a processor; a memory operably connected to the processor; and a communication module operably connected to the processor for communication with the operator and the outdoor lighting network. The processor is operable to receive a policy; and check the policy for consistency against the OLN policy. When the policy is consistent with the OLN policy, the processor is further operable to determine attributes and configuration commands for each of the plurality of lighting unit control apparatus in accordance with the policy; and communicate the attributes and the configuration commands for each of the plurality of lighting unit control apparatus to a corresponding one of the plurality of lighting unit control apparatus.

Another aspect of the invention provides a lighting unit control apparatus to manage an outdoor lighting network including a processor; a memory operably connected to the processor; and a communication module operably connected to the processor for communication between the operator and the outdoor lighting network. The processor is operable to: receive attributes and configuration commands from a central control apparatus; and operate at least one associated lighting unit in accordance with the configuration commands.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

In the drawing figures, like reference characters generally refer to the same parts throughout the different views. Also, the drawing figures are not necessarily to scale, emphasis instead generally being placed upon illustrating the principles of the invention.

Figure 1:
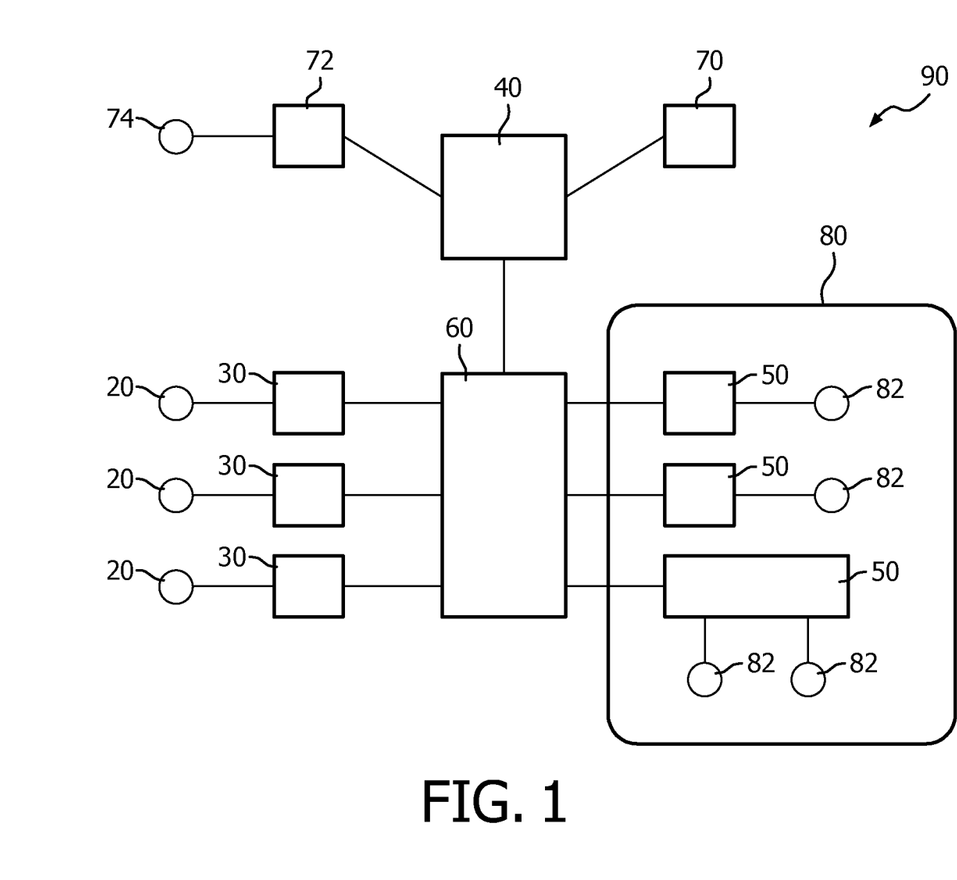
FIG. 1 is a block diagram of an exemplary embodiment of a PBLM system for an outdoor lighting network in accordance with the invention.

FIG. 1 is a block diagram of an exemplary embodiment of a PBLM system for an outdoor lighting network in accordance with the invention. FIG. 1 provides an overview of the PBLM system, which enables an operator to manage an outdoor lighting network (OLN). Details of portions of the overall PBLM system, including the user control apparatus, the central control apparatus, and the lighting unit control apparatus, are provided in FIGS. 4, 5, and 6, respectively.

Referring to FIG. 1, the PBLM system 90 in this example includes a number of optional user control apparatus 30; a central control apparatus 40; a number of lighting unit control apparatus 50; a communication system 60 operably connected between the optional user control apparatus 30, the central control apparatus 40, the lighting unit control apparatus 50; and a repository 70 in communication with the central control apparatus 40. The PBLM system 90 can also include lighting units 82, each of the lighting units 82 being associated with one of the lighting unit control apparatus 50. The PBLM system 90 can also include a telemanagement station 72 in communication with the central control apparatus 40 to allow an operator 74 to provide input to the PBLM system 90. The repository 70 and the telemanagement station 72 can be in communication with the central control apparatus 40 directly by being connected to the central control apparatus 40 or can be connected to the central control apparatus 40 through the communication system 60.

The PBLM system 90 allows the operator 74 to specify behavior of the outdoor lighting network 80 without having to separately specify behavior of each lighting unit control apparatus 50. In one example, the PBLM system 90 operates with the central control apparatus 40 and with the repository 70 storing an OLN policy for the PBLM system 90, and storing attributes and the configuration commands for each of the lighting unit control apparatus 50. Each of the lighting unit control apparatus 50 can also store the attributes, and store and execute the configuration commands which apply to the individual lighting unit control apparatus 50. A set of attributes defined the configuration parameters for each lighting unit control apparatus 50 and associated lighting unit or units 82. The configuration commands direct the lighting unit control apparatus 50 to take immediate action and/or to schedule future action.

Figure 2:
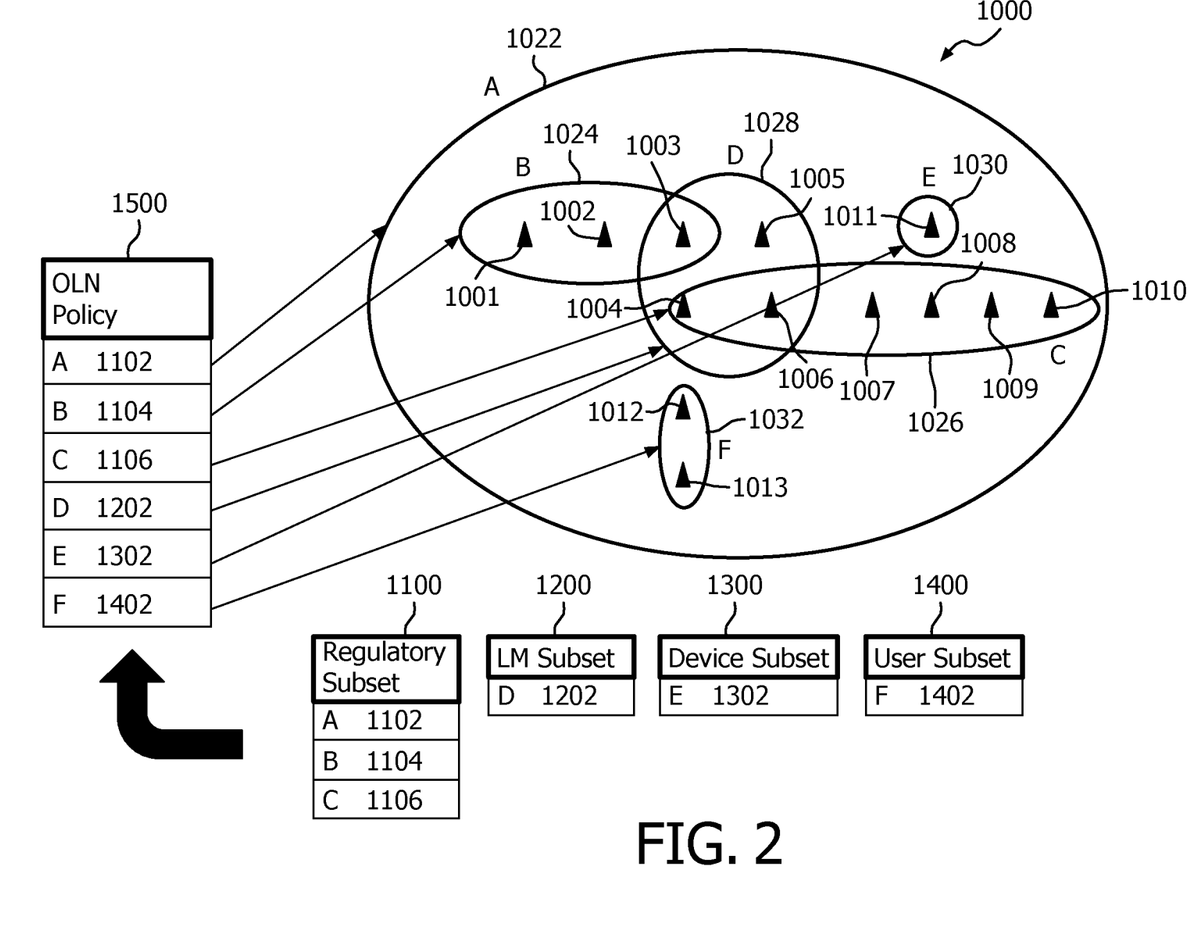
FIG. 2 is a schematic diagram of policies, policy subsets, and an OLN policy for an exemplary embodiment of a PBLM system for an outdoor lighting network in accordance with the invention.

FIG. 2 is a schematic diagram of policies, policy subsets, and an OLN policy for an exemplary embodiment of a PBLM system for an outdoor lighting network in accordance with the invention. One or more policies are combined into a consistent OLN policy, which governs operation of the outdoor lighting network. The policies can be combined into policy subsets, which designate the source of the policies and permit a number of policies to be introduced as a unit.

In this example, regulatory subset 1100 includes policies 1102, 1104, 1106; lighting manager (LM) subset 1200 includes policy 1202; device subset 1300 includes policy 1302; and user subset 1400 includes policy 1402. The subsets can be named to designate their source or subject matter. In this example, the regulatory subset 1100 includes policies concerning regulation, the LM subset 1200 includes policies from the lighting manager, the device subset 1300 includes policies initiated by devices such as lighting unit control apparatus, and the user subset 1400 includes policies from users. Those skilled in the art will appreciate that any number of subsets can be used for different sources or subject matters as desired for a particular application. In one embodiment, the subset designation can be used to set the hierarchy for the policies, e.g., a policy from a regulatory subset will take priority over a policy from a LM subset.

The policies from the regulatory subset 1100, LM subset 1200, device subset 1300, and user subset 1400 are checked for consistency and, when consistent, are combined in OLN policy 1500. The OLN policy 1500 governs behavior and operation of the outdoor lighting network 1000 including lighting units 1001 through 1013. Elliptical boundaries are provided about the lighting units in the outdoor lighting network 1000 to illustrate mapping of policies in the OLN policy 1500 to lighting units. The policy can govern any behavior, operation, and/or configuration of the associated lighting unit. In this example, policy 1102 maps to all the lighting units 1001 through 1013 as illustrated by boundary 1022. Policy 1104 maps to lighting units 1001, 1002, 1003 as illustrated by boundary 1024. Policy 1106 maps to lighting units 1004, 1006, 1007, 1008, 1009, 1010 as illustrated by boundary 1026. Policy 1202 maps to lighting units 1003 through 1006 as illustrated by boundary 1028. Policy 1302 maps to lighting unit 1011 as illustrated by boundary 1030. Policy 1402 maps to lighting units 1012, 1013 as illustrated by boundary 1032. As shown by the boundaries, a number of policies can apply to a single lighting unit. For example, lighting unit 1003 is governed by policies 1102, 1104, and 1202. The multiple policies are checked for consistency before they are incorporated in the OLN policy when the multiple policies are to be applied to a single lighting unit.

The OLN policy for the PBLM system is a set of mutually consistent policies that govern the operation of the outdoor lighting network. A policy as defined herein is one or more conditional statements that represent desired behavior, performance, operation, and/or configuration of at least one device connected to the outdoor lighting network. The policy can specify anything controllable or variable for a lighting unit or other device: values for attributes, geographic regions, and scheduling (timing), for example. A policy can be specified in a high level language (something humans easily understand), and the PBLM system can translate the policy to specific configuration and operation commands for the OLN devices. For example, a policy can be an if-then-else-condition, i.e., If a set of conditions is satisfied, then perform a set of actions. The attributes are possible values that represent the capabilities and determine the behavior of devices connected to the OLN such as one or more of the following attributes with examples of values in parentheses: device type (lighting unit, camera, sensor), lighting unit ID (number), lighting unit type (street light, highway, city center, ballpark), lamp type (LED, sodium-scandium metal halide, high pressure sodium), max lamp power (Watts), dimming range (range of supported dimming values), and any other information desired concerning the lighting unit control apparatus 50 and associated lighting units 82. When the lighting unit control apparatus 50 is associated with more than one lighting unit 82, the lighting unit control apparatus 50 can include attributes for each of the lighting units. The configuration commands are sent by the central control apparatus 40 to the lighting unit control apparatus 50 to execute the OLN policy by scheduling a new behavior and/or action for the lighting units 82.

The configuration commands are defined herein as policies sent from the central control apparatus to the lighting unit control apparatus. The lighting unit control apparatus 50 translates the configuration commands into executable commands, which are implemented at the individual lighting units 82. The lighting unit control apparatus 50 does not need to check the configuration commands for consistency, since they have already been checked for consistency with the OLN policy by the central control apparatus, but can optionally perform checks as desired for a particular application.

Two or more policies or policy subsets are consistent when determining attributes and configuration commands for all the lighting unit control apparatus and associated lighting unit or units in the outdoor lighting network does not result in disjoint values for attributes, i.e., the attribute values are not inconsistent with each other. Two policies are inconsistent when the end actions (e.g., configuration commands for the lighting unit control apparatus and associated lighting unit or units in the outdoor lighting network) are inconsistent or violate any other higher priority policy. For example, if a policy requires the lights to be turned off during certain hours and a higher priority policy requires the light to be on, these policies are inconsistent. A new proposed policy that is inconsistent with the existing OLN policy is not entered into the OLN policy. In one embodiment, the PBLM system operates on a first-come-first-served basis, so the new proposed policy that is not consistent is disregarded. In another embodiment, a new higher ranked policy that is not consistent with an existing lower ranked policy invalidates the existing lower ranked policy, which is disallowed from the OLN policy. Those skilled in the art will appreciate that priorities can be established as desired for a particular application, e.g., priorities can be set so that a regulatory policy overrides a management policy. In one embodiment, the intersection of two ranges of attribute values can be used when attribute values for a new proposed policy overlap with attribute values in the existing OLN policy.

Referring to FIG. 1, the central control apparatus 40 manages the configuration of all devices in the OLN to ensure that device configuration and operation is consistent with the defined OLN policy. The central control apparatus 40 is operable to receive a policy, such as a policy from the operator 74; check the policy for consistency against the OLN policy; determine attributes and configuration commands for each of the number of lighting unit control apparatus 50 in accordance with the policy when the policy is consistent with the OLN policy; communicate the attributes and the configuration commands for each of the number of lighting unit control apparatus 50 to a corresponding one of the number of lighting unit control apparatus 50. In one embodiment, the central control apparatus 40 is further operable to update the OLN policy and communicate the updated OLN policy to the repository 70 when the policy is consistent with the OLN policy. In one embodiment, the central control apparatus 40 can be further operable to notify an operator that the OLN policy was updated. In one embodiment, an operator can manually change the updated OLN policy in the repository. As policies are added to the OLN policy over time, the OLN policy can become increasingly restrictive. By manually changing the updated OLN policy in the repository, such as deleting policies from the OLN policy, the operator can make the OLN policy less restrictive.

The central control apparatus 40 can also archive an existing OLN policy, such as the OLN policy prior to updating, to provide a historic record of the OLN policies through time. In one embodiment, the central control apparatus 40 can maintains the present OLN policy when the policy is not consistent with the OLN policy. The central control apparatus 40 can also notify an operator that the OLN policy was not changed. The central control apparatus 40 can also suggest modifications to the policy and/or the OLN policy (i.e., either or both of the policy and the OLN policy) to make the policy consistent with the present OLN policy. In addition, the central control apparatus 40 can also suggest the modification of policies within current OLN policy (e.g., deletion of particular policies) to accommodate the new policy.

When the outdoor lighting network is being installed, the policy received can be an initial policy and a provisional policy is stored in the repository 70 as the OLN policy. The central control apparatus 40 is operable to determine attributes and configuration commands for each of the number of lighting unit control apparatus 50 in accordance with the policy when the policy is consistent with a previously installed provisional OLN policy. The provisional OLN policy can be a generic non-restrictive OLN policy suitable for most outdoor lighting networks, an empty permissive policy, or any other initial policy allowing comparison to the initial policy proposed for the particular outdoor lighting network being installed. For example, the provisional OLN policy could be a policy allowing all the lighting units to be on all the time, so that the initial policy would restrict operation of the lighting units as desired by narrowing the provisional OLN policy. In this way, the operator 74, such as the installer, populates the attributes and configuration commands with information about the lighting unit control apparatus 50 and the lighting units 82.

The initial policy, which governs operation of the outdoor lighting network, considers such goals and constraints as regulatory, lighting manager, and device requirements, which can be specified by policies and/or policy subsets. The initial policy can be built up from a number of policy subsets as desired. The operator can build the OLN policy from one policy at a time. In one embodiment, the initial policy includes a regulatory policy subset, a lighting manager policy subset, and a device policy subset. The regulatory policy subset can be further divided into federal, state, and/or local regulatory policy subsets. In one embodiment, the regulatory policy subset can be retrieved from a third party, such as the government or a private company providing regulatory policy subsets as a service.

After the initial policy is implemented in an OLN policy, lighting strategy and/or equipment for the OLN can change, requiring a revised OLN policy. When a new policy is defined to implement a change, the central control apparatus 40 first makes sure it is consistent with other policies, then adds it to the repository and executes the policy. For example, new regulations can be passed which restrict or broaden light operation rules. For example, a new lighting zone regulation can require turning off lights in certain zones (e.g., LZ0 and LZ1) during certain nighttime hours.

A change policy can be used to implement changes to the OLN policy. The central control apparatus 40 receives a change policy, such as a lighting manager or submanager acting as the operator 74. The change policy, which includes at least one proposed change to the existing OLN policy, can include a policy from a regulatory policy subset, a lighting manager policy subset, a device policy subset, and/or any other policy subset. The change policy expresses the desired change in lighting performance/behavior and/or equipment. The central control apparatus 40 then checks the change policy for consistency against the existing OLN policy, e.g., the central control apparatus 40 checks that the proposed policy is feasible and that it is consistent with any higher ranked policy. For example, a proposed change policy from a lighting manager policy subset that would leave the lighting units on all the time would not be feasible if an existing regulatory policy subset implemented in the OLN policy requires the lighting units to be dimmed or off for certain hours. When the change policy is consistent with the OLN policy, the central control apparatus 40 determines attributes and configuration commands for each of the lighting unit control apparatus 50 in accordance with the change policy, and then communicates the attributes and the configuration commands to the corresponding lighting unit control apparatus 50. In one embodiment, the central control apparatus 40 initiates communication of the attributes and the configuration commands to the corresponding lighting unit control apparatus 50. In one embodiment, the central control apparatus 40 also updates the OLN policy and communicates the updated OLN policy to the repository 70. In another embodiment, the lighting unit control apparatus 50 periodically poll the central control apparatus 40 to initiate communication of the attributes and the configuration commands. In one embodiment, when the change policy is from a regulatory policy subset, the central control apparatus 40 can remove inconsistent lighting manager and device policies from the OLN policy. In one embodiment, when the change policy is from a lighting manager or device policy subset, the central control apparatus 40 includes the change policy in the OLN policy after determining the change policy is consistent with the existing OLN policy.

The operating regions available under the OLN policy can be constrained. For example, lighting regulations can require that the lighting units operate within a given color temperature range for a given intensity range. The operator may be able to specify one region within the given color temperature-intensity range for optimum energy consumption and a different region for optimum vehicle safety, but the regions may be disjoint (i.e., inconsistent). While either region meets the lighting regulations, only one region can be present in the OLN policy. In one embodiment, the central control apparatus 40 can suggest that the inconsistent policies be applied at different times or to different lighting units to avoid the inconsistency.

When the change policy is not consistent with the existing OLN policy, the central control apparatus 40 can maintain the existing stored OLN policy and not determine new attributes and configuration commands. In one embodiment, the central control apparatus 40 can also notify the operator 74 that the OLN policy was not changed. In another embodiment, the central control apparatus 40 can suggest possible modifications to the change policy and/or the OLN policy (i.e., either or both of the change policy and the OLN policy) that would make the change policy consistent with the existing OLN policy. For example, a proposed lighting manager policy for dimming street lights by 40% at night can be If ((Light_point_type==street_light) && (Time==midnight_dawn)), then Operating_level=0.6 endif. This is inconsistent with a preexisting (higher priority) regulatory policy requiring that the lights at the center of the city are never to be dimmed, so the OLN policy would not be changed. The central control apparatus 40 can suggest a possible modification to dim street lights by 40% after midnight and before dawn, except in city center, with the policy If ((Light_point_type==street_light) && (Location !=City_center) && (Time==midnight_dawn)), then Operating_level=0.6 endif. If another lighting manager were to suggest dimming lights by 25% on a remote road, dynamically based on traffic, the central control apparatus 40 can advise the lighting manager that the dimming will only be effective between the time the light is turned on and midnight, because the lights are dimmed by 40% after midnight. When the OLN policy is underspecified, so that a range of attribute values are permissible, the central control apparatus 40 can randomly chooses an attribute value within the allowed range.

The lighting unit control apparatus 50 can initiate new policies. In one exemplary embodiment, a newly installed device can automatically provide a change device policy to the central control apparatus for review when the device is installed. The central control apparatus 40 receives a change device policy from the lighting unit control apparatus 50, with the change device policy expressing changes to the lighting unit control apparatus 50 and/or the associated lighting unit or units 82. The central control apparatus 40 then checks the change device policy for consistency against the existing OLN policy, e.g., the central control apparatus 40 checks that the proposed change device policy is feasible and that it is consistent with any higher ranked policy. When the change device policy is consistent with the OLN policy, the central control apparatus 40 determines in accordance with the change device policy attributes and configuration commands for the lighting unit control apparatus 50 initiating the proposed change device policy, and then communicates the attributes and the configuration commands to the corresponding lighting unit control apparatus 50. In one embodiment, the central control apparatus 40 also updates the OLN policy and communicates the updated OLN policy to the repository 70. In one embodiment, the central control apparatus 40 can notify the operator 74 that the OLN policy has been updated in response to the change device policy.

When the device policy is not consistent with the existing OLN policy, the central control apparatus 40 can maintain the existing stored OLN policy and not determine new attributes and configuration commands. In one embodiment, the central control apparatus 40 can also notify the operator 74 and/or the lighting unit control apparatus 50 that the OLN policy was not changed. In another embodiment, the central control apparatus 40 can suggest possible modifications to the device policy and/or the OLN policy (i.e., either or both of the device policy and the OLN policy) that would make the device policy consistent with the existing OLN policy.

The PBLM system 90 can also perform periodic checks of the existing OLN policy. The central control apparatus 40 can periodically receive the OLN policy from the repository 70 and check the OLN policy for internal consistency. The central control apparatus 40 ensures that device configurations are consistent with the existing OLN policy.

In one exemplary embodiment, an individual user 20 can make a control request for a particular action from the outdoor lighting network to a user control apparatus 30, which can provide a temporary user policy to the central control apparatus 40. One example would be a public safety user, such as a policeman, switching on the lights in an area (e.g., sports field) in the event of an emergency and setting up a lighting level above recommended standard. The central control apparatus 40 checks the temporary user policy for consistency against the OLN policy and determines the attributes and the configuration commands for the one of the number of lighting unit control apparatus 50 in accordance with the temporary user policy when the temporary user policy is consistent with the OLN policy. The central control apparatus 40 then communicates the attributes and the configuration commands for the one of the number of lighting unit control apparatus 50 to the one of the number of lighting unit control apparatus 50. The central control apparatus 40 can then maintain the temporary user policy in effect for a predetermined time for the one of the number of lighting unit control apparatus 50. In one embodiment, the central control apparatus 40 can notify the operator 74 that the OLN policy has been changed by a temporary user policy requested by a user 20.

When the temporary user policy is not consistent with the existing OLN policy, the central control apparatus 40 can maintain the existing stored OLN policy and not determine new attributes and configuration commands. In one embodiment, the central control apparatus 40 can also notify the operator 74 that the OLN policy was not changed. Those skilled in the art will appreciate that the PBLM system 90 can operate independently of the users 20 and the user control apparatus 30, i.e., that the users 20 and the user control apparatus 30 can optionally be omitted from the PBLM system 90.

The operator 74 can be any type of operator who is given authority to control an outdoor lighting network, such as installers, managers, submanagers, or the like. In one example, the operator is an installer who initially installs the PBLM system, such as setting up for a given municipality. The installer can work for the company providing the PBLM system or a third party provider. The installer can prepare the regulatory policy subset covering prevailing regulations. In another example, the operator is a lighting manager (LM) who manages the network on a day-to-day basis. The lighting manager can prepare the policy subset based on decisions made by the municipality, such as lighting management decisions to save energy, to specify minimum performance, or the like. The lighting manager can operate through the telemanagement station 72. In another example, the operator is a temporary user, such as a policeman, who can submit a temporary user policy to allow temporary control of a portion of the outdoor lighting network. A policeman can use a temporary user policy to switch on the lights in an area (e.g., sports field) in the event of an emergency.

The telemanagement station 72 can be any input device connected directly to the central control apparatus 40 or connected to the central control apparatus 40 through the communication system 60, which allows the operator 74 to manually or automatically input policies, data, instructions, or the like. In one embodiment, the telemanagement station 72 is a web site, keyboard, touch screen, or the like. In another embodiment, the telemanagement station 72 can include an input device, such as a magnetic computer storage device (e.g. hard disks, floppy discs, and magnetic tape), optical disc, or the like.

The repository 70 can be any type of memory capable of storing data, programs, and/or instructions. Exemplary memory includes random access memory (RAM), read-only memory (ROM), flash memory, magnetic computer storage devices (e.g. hard disks, floppy discs, and magnetic tape), optical discs, and the like. The repository 70 can be used for long term and/or short term storage. The repository 70 can be connected directly to the central control apparatus 40 or can be connected to the central control apparatus 40 through the communication system 60. The repository 70 can be a single device or a number of devices, which can optionally be distributed in different locations. When the repository 70 is a number of devices, the different devices can store different information. In one example, the one of the distributed repositories can include a regulatory policy subset, another of the distributed repositories can include a lighting manager policy subset, and another of the distributed repositories can include a device policy subset. In one embodiment, at least one of the distributed repositories can be shared across outdoor lighting networks, such as sharing national regulatory policy subsets in a single national repository and/or sharing regional regulatory policy subsets (e.g., state/local), lighting manager policy subsets, and device policy subsets in regional repositories.

The users 20 can be any type of users who are given authority to control an outdoor lighting network. In one example, the user can be an administrator responsible for day to day operation of the outdoor lighting network. In another example, the user can be emergency responders, such as police, fire fighters, or emergency medics, on foot or in vehicles, who are authorized to use local light control to facilitate their public safety duties. In yet another example, the user can be an artist or event planner who incorporates lighting in an art performance or public event. In yet another example, the user can be a member of the public at large who activates local lighting along foot or bicycle paths. In yet another example, the user can be an intelligent device, such as a vehicle with onboard communications and electronics, to transmit a control request when triggered by a sensor or predetermined conditions being satisfied.

The outdoor lighting network 80 can be any type of outdoor lighting network or portion of an outdoor lighting network under central control. The lighting units within the outdoor lighting network can be individually controlled or controlled as lighting unit groups made up of individual lighting units. A lighting unit as defined herein is one or more light emitting source with any supporting hardware, communications devices, and/or software, such as ballasts, fixtures, processors, and the like, needed to controllably operate the lighting unit. The lighting units 82 can be any type of controllable lighting unit, such as incandescent, fluorescent, high intensity discharge (HID), and/or solid state lighting units, presently in existence or similar later developed devices. Those skilled in the art will appreciate that solid state lighting units, such as LED lighting units, offer a greater degree of controllability of features than other current lighting unit types, particularly for features such as intensity, color, and/or flashing. The lighting units within the outdoor lighting network 80 can be a mixture of different lighting unit types. In one example, a number of the lighting unit control apparatus 50 can be combined as units with the lighting units 82 to form portions of the outdoor lighting network 80.

The communication system 60 can be any single or combination of communications networks enabling direct or indirect communication between the users 20 and the outdoor lighting network 80. In one example, the communication system communicates over a wide area network (WAN), which is a communications network that uses such devices as telephone lines, satellite dishes, or radio waves to span a larger geographic area than can be covered by a local area network (LAN). One example of a WAN is the Internet. In another example, the communication system communicates over a public safety communication network. In another example, the communication system communicates over a cellular or personal communications service (PCS) network. The network for users to communicate with the outdoor lighting network can be part of outdoor lighting network or can be totally independent of the outdoor lighting network. Those skilled in the art will appreciate that the different networks can be used in combination, such as the user communicating with the public safety communication network and the outdoor lighting network communicating with WAN, or private mesh networks accessible only to the lighting managers. The different networks can be controlled by different entities, such as one network for city streets being controlled by city authorities and one network for highways being controlled by state or federal authorities.

Figure 3:
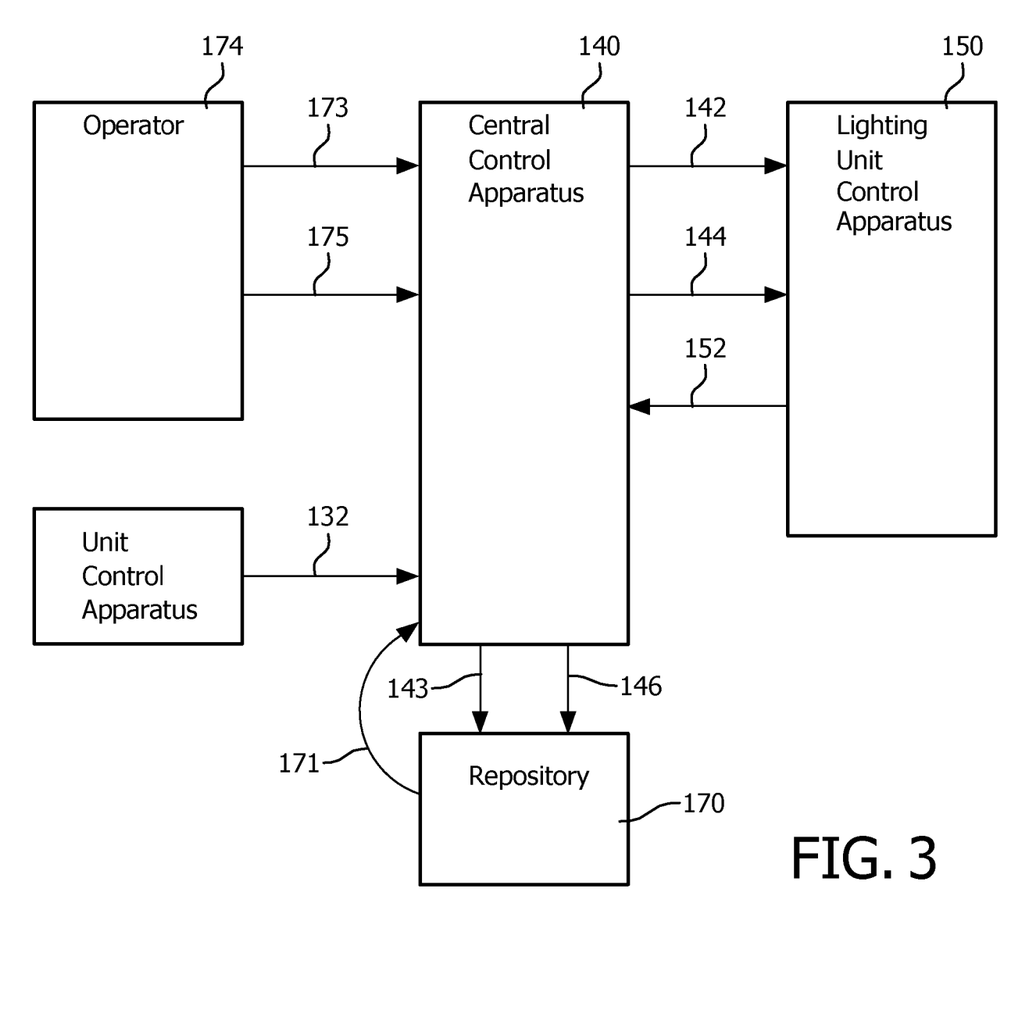
FIG. 3 is a block diagram of information flow through an exemplary embodiment of a PBLM system for an outdoor lighting network in accordance with the invention.

FIG. 3 is a block diagram of information flow through an exemplary embodiment of a PBLM system for an outdoor lighting network in accordance with the invention. The operator 174 can provide the initial policy 173 to the central control apparatus 140 during installation. The central control apparatus 140 determines attributes 142 and configuration commands 144, which the central control apparatus 140 communicates to the lighting unit control apparatus 150. The central control apparatus 140 can also update the OLN policy, and communicate the attributes 143 and the updated OLN policy 146 to the repository 170. The operator 174 can provide a change policy 175 to the central control apparatus 140 to request a change to the OLN policy. The user control apparatus 130 can provide a temporary user policy 132 to the central control apparatus 140 when a user needs temporary control of a portion of the outdoor lighting system. The repository 170 can periodically provide the OLN policy 171 to the central control apparatus 140 so the central control apparatus 140 can check the OLN policy for internal consistency.

The lighting unit control apparatus 150 can provide a change device policy 152 to the central control apparatus 140 when capabilities of the lighting unit or lighting unit control apparatus 150 change. In one embodiment, the lighting unit control apparatus 150 can generate the change device policy 152 when a new or different lighting unit control apparatus 150 or lighting unit is installed. For example, the lighting unit control apparatus 150 can generate the change device policy 152 when new capability, such as a light sensor or other new sensor is added to a lighting unit control apparatus 150. In this way, the incremental upgrade of devices (i.e., device by device) is easily manageable, even if the capabilities of devices differ.

A change device policy can also be used to account for changing local conditions at the lighting unit control apparatus. In another embodiment, the lighting unit control apparatus 150 can generate the change device policy 152 when the lighting unit control apparatus 150 is sensitive to external factors, such as ambient light, rain, nearby traffic activity, or the like, and the lighting unit control apparatus 150 generates the change device policy 152 in response to changes in the external factors. For example, the lighting unit control apparatus 150 can be sensitive to rain or fog to generate a change device policy 152 with a preferred lighting unit intensity and/or color temperature appropriate for the rain or fog when the existing OLN policy includes a lighting unit intensity and/or color temperature appropriate for sunny conditions. When the change device policy 152 is consistent with the OLN policy, each lighting unit control apparatus 150 can operate the associated lighting units in a manner appropriate for the local area.

The repository 70 can include the OLN policy and the attributes and configuration commands for each lighting unit control apparatus 50 and associated lighting unit or units 82. The OLN policy is a set of mutually consistent policies that govern the behavior of the outdoor lighting network. The attributes define the configuration parameters for each lighting unit control apparatus 50 and associated lighting unit or units 82. The configuration commands direct the lighting unit control apparatus 50 to take immediate action and/or to schedule future action.

Table 1 below is an exemplary set of attributes with their values defining possible configurations for devices connected to the outdoor lighting network. In this example, the device type is not limited to a lighting unit (light point), but can indicate a different type of device, such as a camera or a sensor. The PBLM system can use policies to manage bandwidth for functions such as surveillance, considering the needs of the particular municipality or county. The attributes can be stored in the repository 70 and/or in the lighting unit control apparatus 50. When the lighting unit control apparatus 50 is associated with more than one lighting unit 82, attributes for each of the lighting units can be stored in the lighting unit control apparatus 50. The operator 74 can create new attributes as desired, such as new attributes for a new device with new capabilities that are not defined in the previous set of attributes.

TABLE 1

| Attributes | Values |
| --- | --- |
| Device Type | Light point, camera, sensor, etc |
| Light point ID | A unique number |
| Light point type | Street light, highway, city center, ballpark, park light. |
| Lamp type | {LED, Sodium-scandium metal halide (MH), High pressure sodium (HPS)} |
| Max Lamp power | Max Watts |
| Dimming range | Range of supported dimming values for specific light source and controller |
| Operating level | Relative value, e.g. {100%, 75%, 50%} |
| Colors | Color temperature, e.g. {6000 K} |
| configuration | Spectral power distribution, e.g. { } |
| Lighting distribution | Uniformity statistics Direction: {Straight down, Left, Right, Front} |
| Energy consumption | Watts, e.g., {500 watts} |
| Lifetime (lamp) | Total ON time e.g. {2000 Hours} Total ON/OFF cycles e.g. {800} |
| Location | GPS geo-location e.g., {x, y} Street name Zip code Area, for example, NW in Wash. DC |
| Time | Year:Month:Day:Hh:Mm:Ss |
| Luminaire type | { } |
| Lighting Zone | Defined by regulation, e.g. {LZ0, . . . LZ5} |

A policy or policy subset can be a conditional statement that governs choices about the configuration and operation of devices connected to the OLN. A group of related policies form a policy subset, such as a regulatory policy subset. In one embodiment, the policy or policy subset is expressed as an if-then-else-condition: If a set of conditions is satisfied, then perform a set of actions. A policy defines the conditions under which a given attribute can be changed (an action). For example, the policy "turn all the lights OFF at dawn" changes the current configuration of the outdoor lighting network. Conditions can also be defined in terms of OLN attributes. For example, the condition "if current time is mid-night and the Lighting Zone is LZ3" includes time, which is an OLN attribute. Each policy can be tagged with the policy set to which it belongs, its author, priority level, and/or the like. In one embodiment, only certain operators are authorized to change certain attributes.

In one example of a policy, the lighting manager can decide that street lights are to be dimmed by 40% at night to save energy. The lighting manager can write the following lighting manager policy: If ((Light_point_type==street_light) && (Time==midnight_dawn)), then Operating_level=0.6 endif.

Those skilled in the art will appreciate that the policy or policy subset can be expressed in forms other than an if-then-else-condition. In one embodiment, the policy or policy subset can be expressed as entries in a table, with columns representing conditions and actions, and rows representing policies. In another embodiment, the policy or policy subset can be expressed in a machine readable mark-up language, such as Extensible Markup Language (XML). A policy can be specified in a high level language (something humans easily understand), and the PBLM system can translate the policy to specific configuration and operation commands for the OLN devices.

Figure 4:
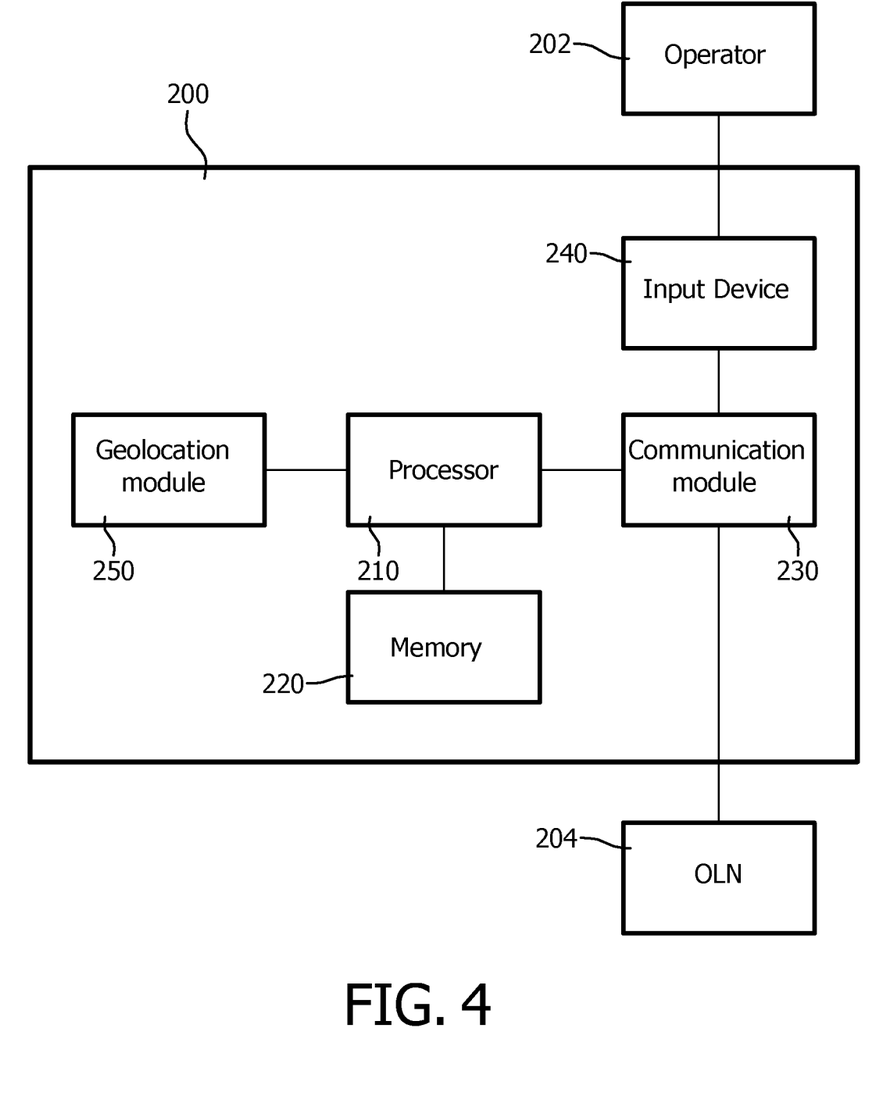
FIG. 4 is a block diagram for an exemplary embodiment of a user control apparatus for an outdoor lighting network in accordance with the invention.

FIG. 4 is a block diagram for an exemplary embodiment of a user control apparatus for an outdoor lighting network in accordance with the invention. As illustrated in FIG. 1, the user control apparatus is accessible to the user and can be used to control the outdoor lighting network through the central control apparatus. The user can control the outdoor lighting network to the extent which the user is authorized. The user control apparatus can be implemented as a dedicated device or incorporated in another device. The user control apparatus can be implemented in a mobile phone, PDA, computer (e.g., laptop, tablet such as an iPad), vehicle including a car, airplane, helicopter, boat, or the like, device in a vehicle, mobile GPS device, embedded device, any intelligent device/machine, or any other device accessible to a user. The user control apparatus can also be incorporated in a device which is itself a user, e.g., a security camera which needs different light levels according to the particular situation. In one example, a user control apparatus can operate independently as an autonomous device, and autonomously generate user temporary user policies without human interaction.

The user control apparatus 200 enables a user 202, such as a person or an intelligent device, to control certain features of an outdoor lighting network 204. The user control apparatus 200 also enables a user to discover (or detect) the availability of the user oriented lighting control service at any given location and time. The user control apparatus 200 can be any type of apparatus receiving user input and producing a temporary user policy. In one embodiment, the temporary user policy is encrypted with the user's secret private key to allow validation of the identity of the user and proof of the integrity of the temporary user policy.

When the user 202 is an intelligent device, the user control apparatus 200 can automatically generate the user input and produce the temporary user policy. In one embodiment, the intelligent device responds to external stimulus, such as a transponder operating independently of the user control apparatus 200, e.g., receiving/detecting weather and roadway conditions, to initiate the user input. Another example of this would be a communication device within a vehicle that alerts a local sensor external to the vehicle, and the local sensor provides external stimulus to an intelligent device of the user control apparatus 200, which automatically generates the user input, e.g., to turn on darkened lighting units when a vehicle approaches. In another embodiment, the user control apparatus 200 can include a means to detect when/where the user lighting control service is available for a given user by combining information received from the OLN with user location information. Once the service availability is detected, the user control apparatus 200 can indicate such availability to the user and enable the user input interface.

The user control apparatus 200 includes a processor 210; a memory 220 operably connected to the processor 210; and a communication module 230 operably connected to the processor 210 for communication between the user 202 and the outdoor lighting network 204. The processor 210 is operable to generate a temporary user policy; and transmit the temporary user policy through the communication module 230 to the outdoor lighting network.

The communication module 230 can be any type of device that can communicate with the outdoor lighting network 204, such as a ZigBee chip, radio chip with an application layer, application-specific integrated circuit (ASIC), or the like. The communication module 230 can communicate using any desired technology, such as a cellular data communication protocol (e.g., GSM, CDMA, GPRS, EDGE, 3G, LTE, WiMAX), ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like. In one example, the communication module 230 communicates with the outdoor lighting network 204 through a communication system.

The user control apparatus 200 can include an input device 240, such as a keyboard, touch screen, or the like, operably connected to the communication module 230 to allow the user to manually input data, such as user authentication data, area of interest, illuminance requirements, and/or operation schedules. The user 202 can input data individually as desired for a particular application or can input data as a pre-configured request selectable by the user 202 from a number of pre-configured requests.

The user control apparatus 200 can include a geolocation module 250, such as a global positioning system (GPS) receiver, providing the current location, such as GPS coordinates, of the user 202 to the processor 210. In one embodiment, the user control apparatus 200 includes a light demand analyzer 260 operably connected to the processor 210 to determine the area of interest, illuminance requirements, and/or operation schedules from user input, external input, additional sensors, additional processors, combinations thereof, or the like.

The processor 210 can be any type of device that can perform at least one or more of the following: create instructions, execute instructions, and/or process data in accordance with instructions. In one example, the processor is a computer, such as a personal computer, server, or the like. The memory 220 can be any type of memory capable of storing data, programs, and/or instructions. Exemplary memory includes random access memory (RAM), read-only memory (ROM), flash memory, magnetic computer storage devices (e.g. hard disks, floppy discs, and magnetic tape), optical discs, and the like. The memory 220 can be used for long term and/or short term storage.

Figure 5:
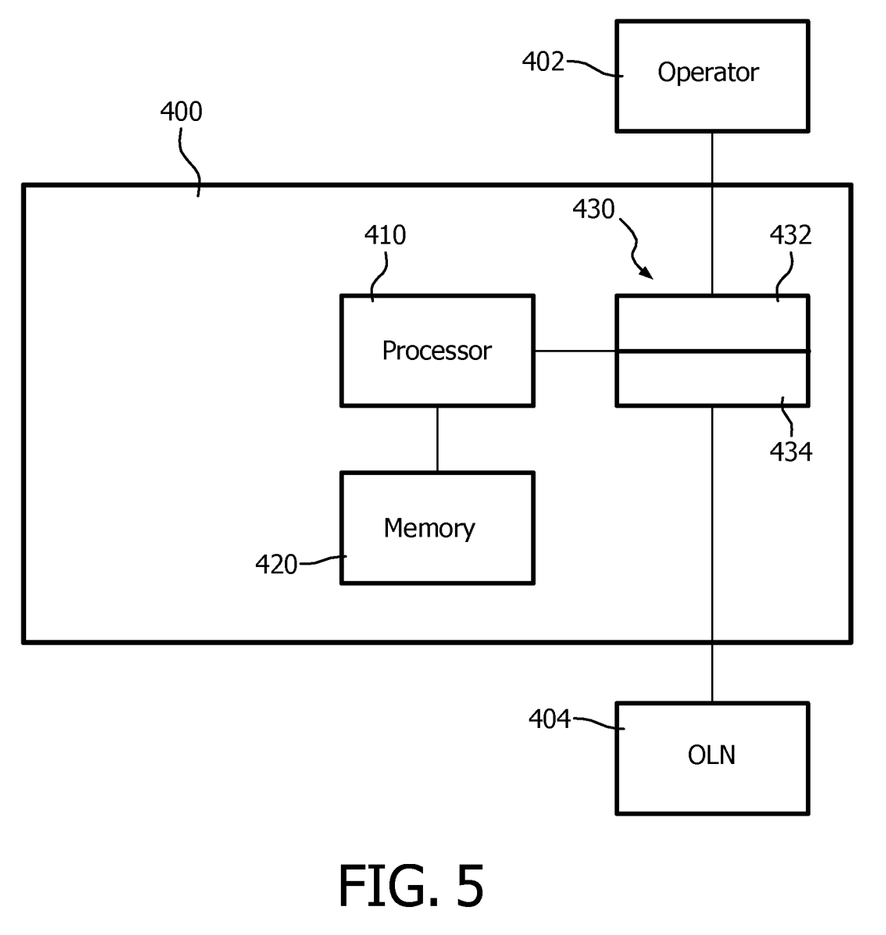
FIG. 5 is a block diagram for an exemplary embodiment of a central control apparatus for an outdoor lighting network in accordance with the invention.

FIG. 5 is a block diagram for an exemplary embodiment of a central control apparatus 400 operatively connected to an outdoor lighting network 404 and an operator 402 in accordance with the invention. The central control apparatus can be implemented in a processor, microprocessor, server, computer, or any other intelligent device with access to the user and the outdoor lighting network. The central control apparatus can be located in a central location or can be distributed over a number of locations.

The central control apparatus 400 enables an operator to manage an outdoor lighting network (OLN). The central control apparatus 400 includes a processor 410; a memory 420 operably connected to the processor 410; and a communication module 430 operably connected to the processor 410 for communication with the operator 402 and the outdoor lighting network 404. The processor 410 is operable to receive a policy from the operator; and check the policy for consistency against the OLN policy. When the policy is consistent with the OLN policy, the processor 410 is further operable to determine attributes and configuration commands for each of the number of lighting unit control apparatus in accordance with the policy; communicate the attributes and the configuration commands for each of the number of lighting unit control apparatus to a corresponding one of the number of lighting unit control apparatus. The processor 410 can also be operable to update the OLN policy; and communicate the updated OLN policy to the repository. In this example, the communication module 430 includes a operator communication module 432 operably connected to communicate between the processor 410 and the operator 402 and a light communication module 434 operably connected to communicate between the processor 410 and the outdoor lighting network 404 including the lighting units.

The policy received from the operator depends on the particular operation of the PBLM system. In one embodiment, the policy is an initial policy; and the central control apparatus is operable to determine attributes and configuration commands for each of the number of lighting unit control apparatus in accordance with the initial policy when the initial policy is consistent with a provisional policy. The initial policy can include a regulatory policy subset, a lighting manager policy subset, and a device policy subset. In another embodiment, the policy is a change policy including at least one policy subset selected from the group consisting of a regulatory policy subset, a lighting manager policy subset, and a device policy subset. When the policy is not consistent with the OLN policy, the processor 410 is operable to maintain the OLN policy. In one embodiment, the processor 410 can be further operable to notify the operator that the OLN policy was not changed or to suggest modifications to the policy and/or the OLN policy (i.e., either or both of the policy and the OLN policy) to make the policy consistent with the OLN policy. In another embodiment, the processor 410 can be further operable to notify the operator when the OLN policy changes and the source of the change, e.g., due to a new device policy or temporary user policy. In one embodiment, the repository can be operable to store the attributes and the configuration commands for each of the number of lighting unit control apparatus and the processor 410 can be operable to communicate the attributes and the configuration commands for each of the number of lighting unit control apparatus to the repository.

In one embodiment, one of the number of lighting unit control apparatus is operable to generate a change device policy, and the processor 410 is operable to receive the change device policy from a lighting unit control apparatus; and check the change device policy for consistency against the OLN policy. When the change device policy is consistent with the OLN policy, the processor 410 is further operable to determine the attributes and the configuration commands for the one of the number of lighting unit control apparatus in accordance with the change device policy; and communicate the attributes and the configuration commands for the one of the number of lighting unit control apparatus to the one of the number of lighting unit control apparatus. In one embodiment, the processor 410 is further operable to update the OLN policy and communicate the updated OLN policy to the repository.

In another embodiment, the processor 410 is further operable to receive a temporary user policy from a user control apparatus; and check the temporary user policy for consistency against the OLN policy. When the temporary user policy is consistent with the OLN policy, the processor 410 is further operable to determine the attributes and the configuration commands for the one of the number of lighting unit control apparatus in accordance with the temporary user policy; communicate the attributes and the configuration commands for the one of the number of lighting unit control apparatus to the one of the number of lighting unit control apparatus; and maintain the temporary user policy in effect for a predetermined time for the one of the number of lighting unit control apparatus.

In another embodiment, the processor (410) is further operable to periodically receive the OLN policy from the repository; and check the OLN policy for internal consistency.

The communication module 430 can be any type of device that can communicate with the operator 402 and/or the outdoor lighting network 404, such as a ZigBee chip, radio chip with an application layer, application-specific integrated circuit (ASIC), or the like. The communication module 430 can communicate using any desired technology, such as a cellular data communication protocol (e.g., GSM, CDMA, GPRS, EDGE, 3G, LTE, WiMAX), ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like. In one example, the communication module 430 communicates with the operator 402 and/or the outdoor lighting network 404 through a communication system.

The processor 410 can be any type of device that can perform one or more of the following: create instructions, execute instructions, and/or process data in accordance with instructions. In one example, the processor is a computer, such as a personal computer, server, or the like. The memory 420 can be any type of memory capable of storing data, programs, and/or instructions. Exemplary memory includes random access memory (RAM), read-only memory (ROM), flash memory, magnetic computer storage devices (e.g. hard disks, floppy discs, and magnetic tape), optical discs, and the like. The memory 420 can be used for long term and/or short term storage.

Figure 6:
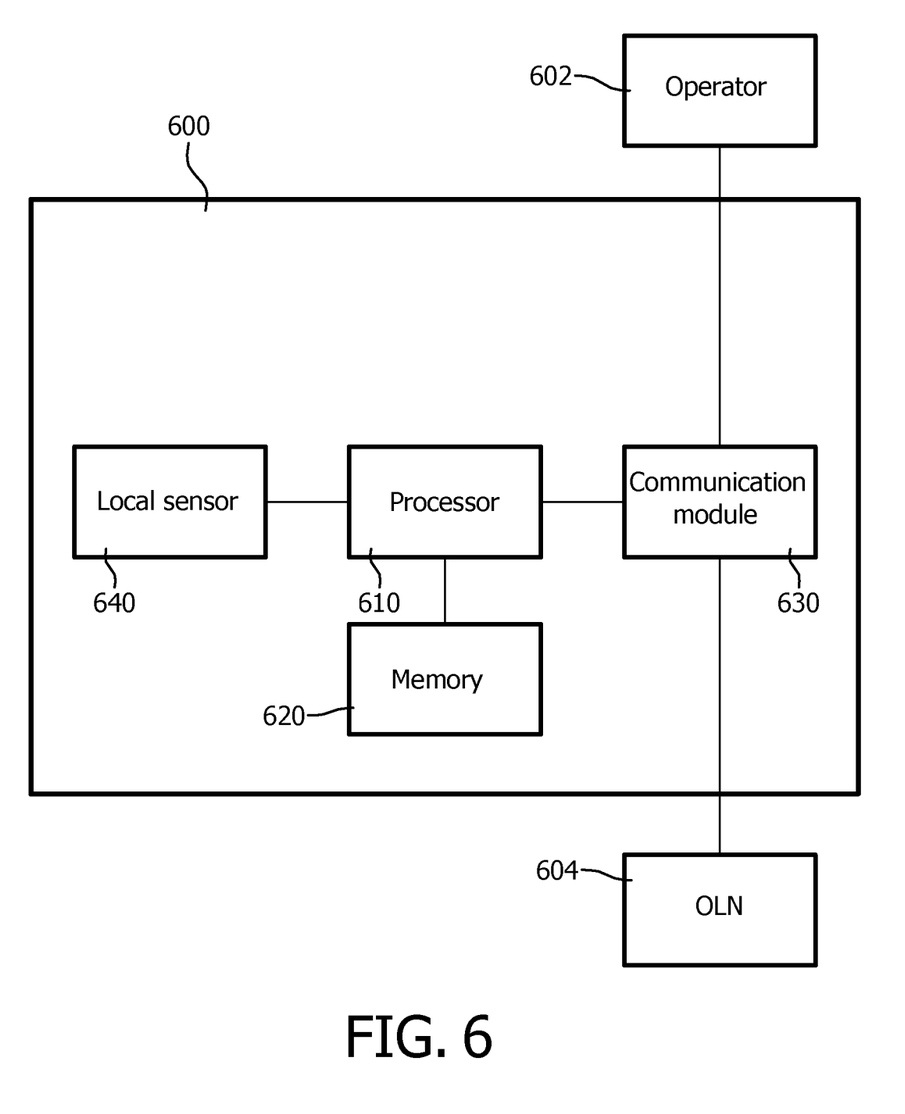
FIG. 6 is a block diagram for an exemplary embodiment of a lighting unit control apparatus for an outdoor lighting network in accordance with the invention.

FIG. 6 is a block diagram for an exemplary embodiment of a lighting unit control apparatus enabling an operator to manage an outdoor lighting network (OLN) in accordance with the invention. The lighting unit control apparatus can be implemented in a processor, microprocessor, computer, embedded system, or any other electronic device with access to the user and the central control apparatus. The lighting unit control apparatus can be located conveniently in or near the lighting units, such as in a luminaire/fixture, a ballast, an LED driver, an LED panel, a light pole, an associated software/electronics module, or the like. The lighting unit control apparatus can be used to control an individual lighting unit or a group of lighting units. The light unit control apparatus can also be used to control the transmission of lighting control service advertisements to users within its coverage area, where its coverage area may include coverage of the lighting signal, and coverage of any other communication signal that is transmitted by the lighting unit.

The lighting unit control apparatus 600 can receive a resolved control request from and enable an operator 602 to have a predetermined degree of control over certain features of one or more lighting units in an outdoor lighting network 604. The lighting unit control apparatus 600 includes a processor 610; a memory 620 operably connected to the processor 610; and a communication module 630 operably connected to the processor 610 for communication between the operator 602 and the outdoor lighting network 604. The processor 610 is operable to receive attributes and configuration commands from a central control apparatus; and operate at least one associated lighting unit in accordance with the configuration commands. The configuration commands are policies and the lighting unit control apparatus 600 translates the configuration commands into executable commands, which are implemented at the individual lighting units. The processor 610 can be further operable to generate a change device policy subset; and transmit the change device policy subset through the communication module 630 to the outdoor lighting network. In one embodiment, the change device policy subset is generated in response to input from a local sensor 640 operably connected to the processor 610, e.g., a change device policy being generated when a local sensor detects precipitation at the individual lighting unit control apparatus 600.

In one embodiment, the lighting unit control apparatus 600 includes one or more local sensors 640 operably connected to the processor 610. For example, an ambient light sensor can be provided as a local sensor detecting the ambient light level at the lighting unit. Such an ambient light sensor can be used to provide fall-back control when communication to the lighting unit control apparatus is lost, with the lighting unit being turned on when the ambient light sensor detects that it is dark. Other local sensors can include weather sensors, traffic sensors, presence detection sensors, and/or object recognition sensors.

The processor 610 can be any type of device that can perform one or more of the following: create instructions, execute instructions, and/or process data in accordance with instructions. In one example, the processor is a computer, such as a personal computer, server, or the like. The memory 620 can be any type of memory capable of storing data, programs, and/or instructions. Exemplary memory includes random access memory (RAM), read-only memory (ROM), flash memory, magnetic computer storage devices (e.g. hard disks, floppy discs, and magnetic tape), optical discs, and the like. The memory 620 can be used for long term and/or short term storage.

The communication module 630 can be any type of device that can communicate with the operator 602 and/or the outdoor lighting network 604, such as a ZigBee chip, radio chip with an application layer, application-specific integrated circuit (ASIC), or the like. The communication module 630 can communicate using any desired technology, such as a cellular data communication protocol (e.g., GSM, CDMA, GPRS, EDGE, 3G, LTE, WiMAX), ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like. In one example, the communication module 630 communicates with the operator 602 and/or the outdoor lighting network 604 through a communication system.

Those skilled in the art will appreciate that the outdoor lighting network control system is not limited to lighting management and public safety applications, but can be used aesthetically for beautification and entertainment. In one example, the lighting units can change brightness, color, and direction throughout the day and evening to light areas of a city to the best effect. In another example, the brightness, color, direction, and flashing state of the lighting units can be changed as an artistic display. In yet another example, the brightness, color, direction, and flashing state of the lighting units can be changed as an artistic display synchronized with a public performance such as music, fireworks, or the like.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A light management system for an outdoor lighting network (OLN), the system comprising:
    a central control apparatus;
    a plurality of lighting unit control apparatus;
    a communication system operably connecting the central control apparatus and the lighting unit control apparatus; and
    a repository in communication with the central control apparatus, the repository being operable to store an OLN policy, which OLN policy represents the behavior of the OLN;
    wherein the central control apparatus is operable to:
        receive a policy, which policy represents the behavior of one or more lighting unit control apparatus;
        check the policy for consistency against the OLN policy; and
        when the policy is consistent with the OLN policy, the central control apparatus is further operable to:
            determine attributes and configuration commands for each of the plurality of lighting unit control apparatus in accordance with the policy; and
            communicate the attributes and the configuration commands for each of the plurality of lighting unit control apparatus to a corresponding one of the plurality of lighting unit control apparatus.

2. The system of claim 1 wherein:
    when the policy is consistent with the OLN policy, the central control apparatus is further operable to:
        update the OLN policy; and
        communicate the updated OLN policy to the repository.

3. The system of claim 2 wherein:
    when the policy is consistent with the OLN policy, the central control apparatus is further operable to:
        notify an operator that the OLN policy was updated.

4. The system of claim 2 wherein the central control apparatus is further operable to archive an existing OLN policy.

5. The system of claim 4 wherein:
    the initial policy includes a regulatory policy subset, a lighting manager policy subset, and a device policy subset.

6. The system of claim 2 wherein an operator can manually change the updated OLN policy in the repository.

7. The system of claim 1 wherein:
    the policy is an initial policy;
    a provisional policy is stored in the repository as the OLN policy; and
    the central control apparatus (40) is operable to:
        receive the initial policy;
        check the initial policy for consistency against the provisional policy; and
        when the change device policy is consistent with the provisional policy, the central control apparatus is further operable to:
            determine attributes and configuration commands for each of the plurality of lighting unit control apparatus in accordance with the initial policy; and
            communicate the attributes and the configuration commands for each of the plurality of lighting unit control apparatus to a corresponding one of the plurality of lighting unit control apparatus.

8. The system of claim 1 wherein:
    the policy is a change policy having at least one policy included in a policy subset selected from the group consisting of a regulatory policy subset, a lighting manager policy subset, and a device policy subset.

9. The system of claim 8 wherein the central control apparatus is further operable to suggest modifications to at least one of the policy and the OLN policy to make the policy consistent with the present OLN policy.

10. The system of claim 8 wherein the central control apparatus is further operable to notify an operator that the OLN policy was not changed.

11. The system of claim 1 wherein, when the policy is not consistent with the OLN policy, the central control apparatus maintains present OLN policy.

12. The system of claim 1 wherein the repository is further operable to store the attributes and the configuration commands for each of the plurality of lighting unit control apparatus and the central control apparatus is further operable to communicate the attributes and the configuration commands for each of the plurality of lighting unit control apparatus to the repository.

13. The system of claim 1 wherein:
    the policy is a change device policy generated by one of the plurality of lighting unit control apparatus; and
    the central control apparatus is operable to:
        receive the change device policy;
        check the change device policy for consistency against the OLN policy; and
        when the change device policy is consistent with the OLN policy, the central control apparatus is further operable to:
            determine attributes and configuration commands for the one of the plurality of lighting unit control apparatus in accordance with the change device policy; and
            communicate the attributes and the configuration commands for the one of the plurality of lighting unit control apparatus to the one of the plurality of lighting unit control apparatus.

14. The system of claim 1 wherein:
the policy is a temporary user policy generated by a user; and
the central control apparatus is operable to:
  receive the temporary user policy from a user control apparatus;
  check the temporary user policy for consistency against the OLN policy; and
  when the temporary user policy is consistent with the OLN policy, the central control apparatus is further operable to:
    determine the attributes and the configuration commands for one of the plurality of lighting unit control apparatus in accordance with the temporary user policy;
    communicate the attributes and the configuration commands for the one of the plurality of lighting unit control apparatus to the one of the plurality of lighting unit control apparatus; and
    maintain the temporary user policy in effect for a predetermined time for the one of the plurality of lighting unit control apparatus.

15. The system of claim 1 wherein the central control apparatus is further operable to:
  periodically receive the OLN policy from the repository; and
  check the OLN policy for internal consistency.

16. A user control apparatus enabling a user to control certain aspects of an outdoor lighting network (OLN), the apparatus comprising:
  a processor;
  a memory operably connected to the processor; and
  a communication module operably connected to the processor for communication between the user and the outdoor lighting network;
  wherein the processor is operable to:
    detect an availability of a user oriented lighting control service, and if available;
    generate a temporary user policy, which policy represents the behavior of one or more lighting unit control apparatus;
    transmit the temporary user policy through the communication module to the outdoor lighting network.

17. The apparatus of claim 16 wherein:
when the policy is consistent with the OLN policy, the processor is further operable to:
update the OLN policy; and
communicate the updated OLN policy to a repository.

18. The apparatus of claim 16 wherein:
the policy is an initial policy; and
a provisional policy is the OLN policy; and
the processor is operable to:
  receive the initial policy;
  check the initial policy for consistency against the provisional policy; and
  when the change device policy is consistent with the provisional policy, the central control apparatus is further operable to:
    determine attributes and configuration commands for each of the plurality of lighting unit control apparatus in accordance with the initial policy; and
    communicate the attributes and the configuration commands for each of the plurality of lighting unit control apparatus to a corresponding one of the plurality of lighting unit control apparatus.

19. The apparatus of claim 16 wherein:
the policy is a change policy having at least one policy included in a policy subset selected from the group consisting of a regulatory policy subset, a lighting manager policy subset, and a device policy subset.

20. The apparatus of claim 16 wherein, when the policy is not consistent with the OLN policy, the processor is operable to maintain present OLN policy.

21. The apparatus of claim 16 wherein a repository is further operable to store the attributes and the configuration commands for each of the plurality of lighting unit control apparatus and the processor is further operable to communicate the attributes and the configuration commands for each of the plurality of lighting unit control apparatus to the repository.

22. The apparatus of claim 16 wherein:
the policy is a change device policy generated by one of the plurality of lighting unit control apparatus; and
the processor is operable to:
  receive the change device policy;
  check the change device policy for consistency against the OLN policy; and
  when the change device policy is consistent with the OLN policy, the processor is further operable to:
    determine the attributes and the configuration commands for the one of the plurality of lighting unit control apparatus in accordance with the change device policy; and
    communicate the attributes and the configuration commands for the one of the plurality of lighting unit control apparatus to the one of the plurality of lighting unit control apparatus.

23. The apparatus of claim 16 wherein:
the policy is a temporary user policy generated by a user; and
the processor is operable to:
  receive the temporary user policy from a user control apparatus;
  check the temporary user policy for consistency against the OLN policy; and
  when the temporary user policy is consistent with the OLN policy, the processor is further operable to:
    determine the attributes and the configuration commands for the one of the plurality of lighting unit control apparatus in accordance with the temporary user policy;
    communicate the attributes and the configuration commands for the one of the plurality of lighting unit control apparatus to the one of the plurality of lighting unit control apparatus; and
    maintain the temporary user policy in effect for a predetermined time for the one of the plurality of lighting unit control apparatus.

24. The apparatus of claim 23 wherein the processor is further operable to:
  generate a change device policy subset; and
  transmit the change device policy subset through the communication module (630) to the outdoor lighting network.

25. The apparatus of claim 16 wherein the processor is further operable to:
  periodically receive the OLN policy from a repository; and
  check the OLN policy for internal consistency.

26. The apparatus of claim 25 wherein the change device policy subset is generated in response to input from a local sensor operably connected to the processor.

27. A central control apparatus to manage an outdoor lighting network (OLN), the apparatus comprising:
- a processor;
- a memory operably connected to the processor; and
- a communication module operably connected to the processor for communication with the operator and the outdoor lighting network;

wherein the processor is operable to:
- receive a policy, which policy represents the behavior of one or more of a plurality lighting unit control apparatus;
- check the policy for consistency against an OLN policy, which OLN policy represents the behavior of the OLN; and
- when the policy is consistent with the OLN policy, the processor is further operable to:
  - determine attributes and configuration commands for each of the plurality of lighting unit control apparatus in accordance with the policy; and
  - communicate the attributes and the configuration commands for each of the plurality of lighting unit control apparatus to a corresponding one of the plurality of lighting unit control apparatus.

28. The apparatus of claim 27 wherein the processor is further operable to archive an existing OLN policy.

29. The apparatus of claim 27 wherein an operator can manually change the updated OLN policy in the repository.

30. The apparatus of claim 27 wherein:
when the policy is consistent with the OLN policy, the processor is further operable to:
notify an operator that the OLN policy was updated.

31. The apparatus of claim 30 wherein:
the initial policy includes a regulatory policy subset, a lighting manager policy subset, and a device policy subset.

32. The apparatus of claim 31 wherein the processor is further operable to notify an operator that the OLN policy was not changed.

33. The apparatus of claim 31 wherein the processor is further operable to suggest modifications to at least one of the policy and the OLN policy to make the policy consistent with the OLN policy.

* * * * *